United States Patent
Bhattacharjee et al.

(10) Patent No.: US 10,643,093 B1
(45) Date of Patent: May 5, 2020

(54) AUTOMATED BOUNDING BOX GENERATION FOR OBJECTS IN AN IMAGE

(71) Applicant: International Business Machines Corporation, Armonk, NY (US)

(72) Inventors: Bishwaranjan Bhattacharjee, Yorktown Heights, NY (US); John R. Smith, New York, NY (US); Matthew Greenberg, Marina Del Rey, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/194,817

(22) Filed: Nov. 19, 2018

(51) Int. Cl.
   *G06K 9/32* (2006.01)
   *G06T 7/187* (2017.01)
   *G06T 7/181* (2017.01)

(52) U.S. Cl.
   CPC ............ *G06K 9/3233* (2013.01); *G06T 7/181* (2017.01); *G06T 7/187* (2017.01)

(58) Field of Classification Search
   CPC ........ G06K 9/3233; G06T 7/187; G06T 7/181
   See application file for complete search history.

(56) References Cited

U.S. PATENT DOCUMENTS

| | | | |
|---|---|---|---|
| 5,715,325 | A | 2/1998 | Bang et al. |
| 9,841,879 | B1 | 2/2017 | Gray et al. |
| 9,594,774 | B2 | 3/2017 | Bhardwaj et al. |
| 9,927,949 | B2 | 3/2018 | Gray et al. |
| 10,222,942 | B1 * | 3/2019 | Zeiler ....................... G06F 7/08 |
| 2019/0180446 | A1 * | 6/2019 | Medoff ................... G06T 7/187 |

OTHER PUBLICATIONS

Disclosed Anonymously; IP.com Number: IPCOM000251907D; "Intelligent Responsive Image Cropping" ; Dated: Dec. 11, 2017; 8 pages.
https://pjreddie.com/darknet/yolo/'; "You Only Look Once"; Retrieved: Nov. 12, 2018; 10 pages.
Hu et al.; "Autonomous Generation of Bounding Boxes for Image Sets of the Same Object"; Dated: Dec. 10, 2010; 5 pages.
Karpathy et al.; "Deep Visual-Semantic Alignments for Generating Image Descriptions"; Retrieved: Nov. 12, 2018; Retrieved: Nov. 12, 2018; 10 pages.
Russakovsky et al.; "Best of both worlds: human-machine collaboration for object annotation"; Retrieved: Nov. 12, 2018; 11 pages.

* cited by examiner

*Primary Examiner* — Chong Wu
(74) *Attorney, Agent, or Firm* — Cantor Colburn LLP; Anthony Curro

(57) ABSTRACT

One or more embodiments described herein include a computer-implemented method of determining a bounding box for an object in an image. The method includes determining a label for an object in a first image using a first algorithm, and generating a set of images based on the first image, by cropping the first image from a selected direction. The method further includes determining labels for each image in the set using the first algorithm, and removing images from the set such that the remaining images have a label matching the initial label. The method further includes determining a key image for the set, which is the smallest image from the set that has a confidence score exceeding a threshold. Further, the method includes determining a bounding box for the object in the first image based on a perimeter of a portion of the first image that overlaps the key image.

20 Claims, 5 Drawing Sheets

AUTOMATED BOUNDING BOX GENERATION FOR OBJECTS IN AN IMAGE

BACKGROUND

The present invention relates to computing technology, and particularly to techniques for automated bounding box generation for objects in an image. In one or more examples, such images with bounding boxes identified for objects in the images are used as training datasets.

Digital image based object detection has seen increased attention over the past few years. For example, object detection systems are currently being implemented in advanced driver assistance systems (ADAS), e-commerce applications, and various other areas. Conventional object detection methods usually involve two stages. First, in the detection stage, image regions that contain candidates of target objects are detected or localized. Then, in the recognition stage, such regions are further analyzed to recognize the specific content. However, these conventional object detection systems and methods generally require a large amount of training data, computing resources, have slow detection speeds, and can be inaccurate at times. Training data with bounding boxes for objects of interest is not easy to find and requires effort to generate.

SUMMARY

One or more embodiments described herein include a computer-implemented method of determining a bounding box for an object in an image. The method includes determining a label for an object in a first image using a first algorithm, and generating a set of images based on the first image, by cropping the first image from a selected direction. The method further includes determining labels for each image in the set using the first algorithm, and removing images from the set such that the remaining sections of the images have a label matching the initial label. The method further includes determining a key image for the set, which is the smallest image from the set that has a confidence score exceeding a threshold. Further, the method includes determining a bounding box for the object in the first image based on a perimeter of a portion of the first image that overlaps the key image.

According to one or more embodiments of the present invention, a system includes an image database with images that contain one or more objects, and labels identifying the one or more objects in the images. The system further includes processors configured to determine a bounding box for an object in a first image from the image database using a method that includes determining a label for an object in a first image using a first algorithm, and generating a set of images based on the first image, by cropping the first image from a selected direction. The method further includes determining labels for each image in the set using the first algorithm, and removing images from the set such that the remaining images have a label matching the initial label. The method further includes determining a key image for the set, which is the smallest image from the set that has a confidence score exceeding a threshold. Further, the method includes determining a bounding box for the object in the first image based on a perimeter of a portion of the first image that overlaps the key image.

According to one or more embodiments of the present invention a computer program product includes a computer readable storage medium having stored thereon program instructions executable by one or more processing devices to perform a method that includes determining a label for an object in a first image using a first algorithm, and generating a set of images based on the first image, by cropping the first image from a selected direction. The method further includes determining labels for each image in the set using the first algorithm, and removing images from the set such that the remaining images have a label matching the initial label. The method further includes determining a key image for the set, which is the smallest image from the set that has a confidence score exceeding a threshold. Further, the method includes determining a bounding box for the object in the first image based on a perimeter of a portion of the first image that overlaps the key image.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

It is to be understood that the technical solutions are not limited in application to the details of construction and to the arrangements of the components set forth in the following description or illustrated in the drawings. The technical solutions are capable of embodiments in addition to those described and of being practiced and carried out in various ways. Also, it is to be understood that the phraseology and terminology employed herein, as well as the abstract, are for the purpose of description and should not be regarded as limiting. As such, those skilled in the art will appreciate that the conception upon which this disclosure is based may readily be utilized as a basis for the designing of other structures, methods, and systems for carrying out the several purposes of the presently described technical solutions.

BRIEF DESCRIPTION OF THE DRAWINGS

The examples described throughout the present document will be better understood with reference to the following drawings and description. The components in the figures are not necessarily to scale. Moreover, in the figures, like-referenced numerals designate corresponding parts throughout the different views.

DETAILED DESCRIPTION

Figure 1:
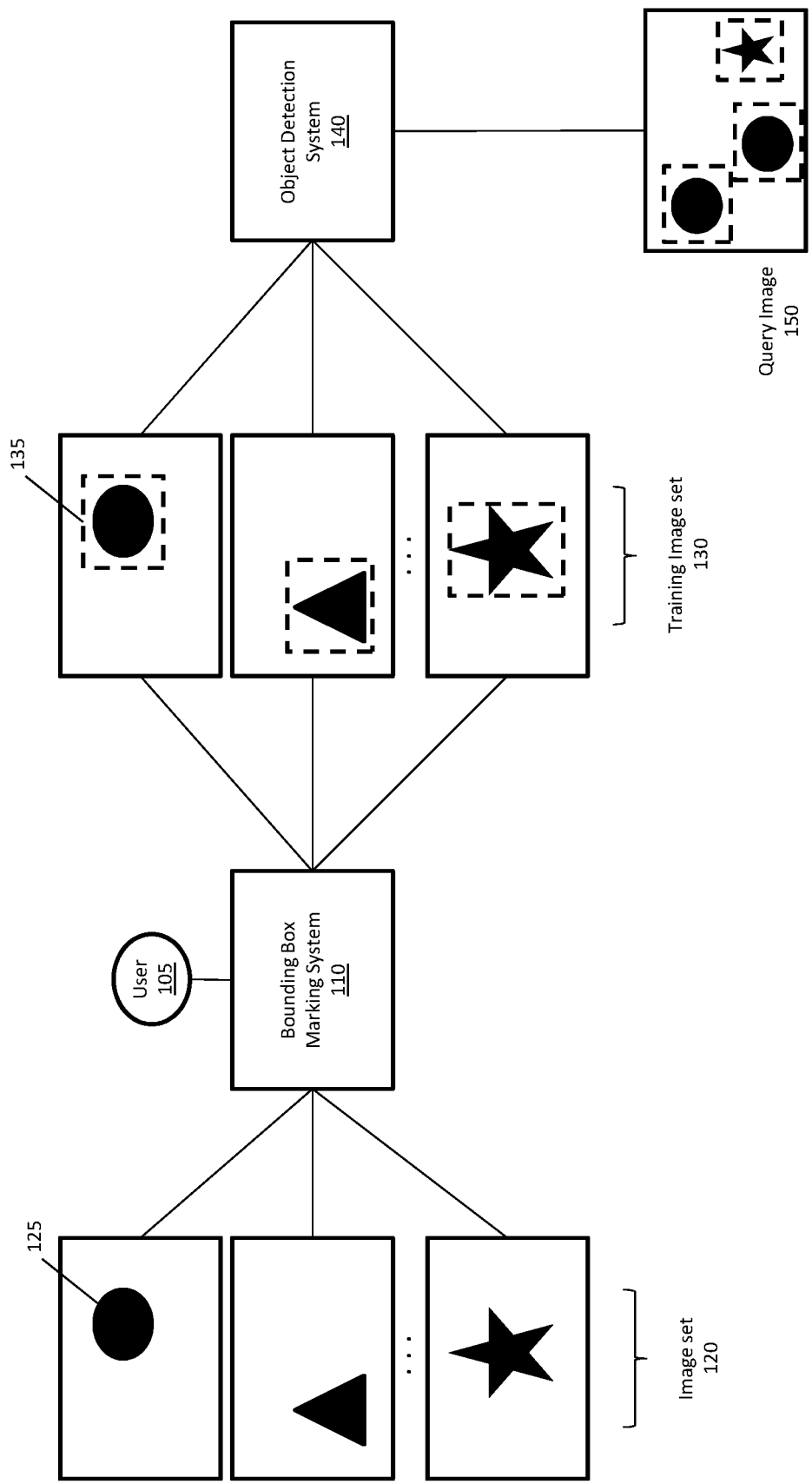
FIG. 1 depicts an existing system that is used for marking training images with bounding boxes.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ± 8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It should be noted that the description herein refers to object detection in electronic images and as such references to "images" herein refer to electronic images, which may be stored in any electronic format, such as JPEG, PNG, and the like.

In computing technology, automatically detecting an object in an image and marking such a detected object in the image can be performed using artificial neural networks (ANN) or machine learning algorithms running on a programmable computer. For an ANN to operate as desired, the ANN has to be trained. In this case, for training an ANN to detect and mark objects in an image, the ANN has to be trained with images that already are associated with bounding boxes for objects in those images. The bounding boxes on such training images is usually done manually. Such manual labor to generate such training images can get expensive and is also slow.

Consequently, at this time, there are not a lot of training images available for ANNs to use and be trained for automatic object detection. This is a major technical challenge to large scale object detection in computing technology. For example, one of the largest databases of training images is the Microsoft Common Objects in COntext (MS COCO), which contains 91 common object categories with 82 of them having more than 5,000 labeled instances. It has a total of 328,000 images.

Accordingly, embodiments of the present invention provide techniques of using an existing ANN, which is trained to recognize a large number of different objects to help in automatically creating the bounding boxes for the detected objects in the training images. According to one or more embodiments of the present invention marking objects in the training images can be done relatively quickly and over a much larger data set, thus addressing the technical problem described herein.

For example, embodiments of the present invention can be used to generate bounding boxes on images available via image databases in which each image is marked with a label identifying one or more objects in the image. Such image databases include IMAGENET-22K with 14 million images, PLACES-2 with 8 million images, OPENIMAGES, and other such image databases.

FIG. 1 depicts an existing system that is used for marking training images with bounding boxes. Here, a user 105 (human) uses a bounding box marking system 110 to manually create a training image set 130 from an image set 120. The user creates the training image set 130 by manually marking a bounding box 135 on an object 125 in each image in the image set 130. A corresponding image with the bounding box 135 is stored in the training image set 130. It is understood that the depicted objects are examples and that in one or more embodiments of the present invention the image set 130 can contain a large number of images (thousands, millions etc.) and that each image can contain one or more objects 125, which can be more complex than those depicted in FIG. 1. The training image set 130 thus created is used to train an object detection system 140 that can include an ANN. The object detection system 140, based on the training, can automatically detect one or more objects in a query image 150.

The bounding box marking system 110 and the object detection system 140 can be computing devices, such as computer servers, desktop computers, laptop computers, tablet computers, phones, or any other computing devices. The sets of images (120 and 130) can be accessed/stored on database systems.

Figure 2:
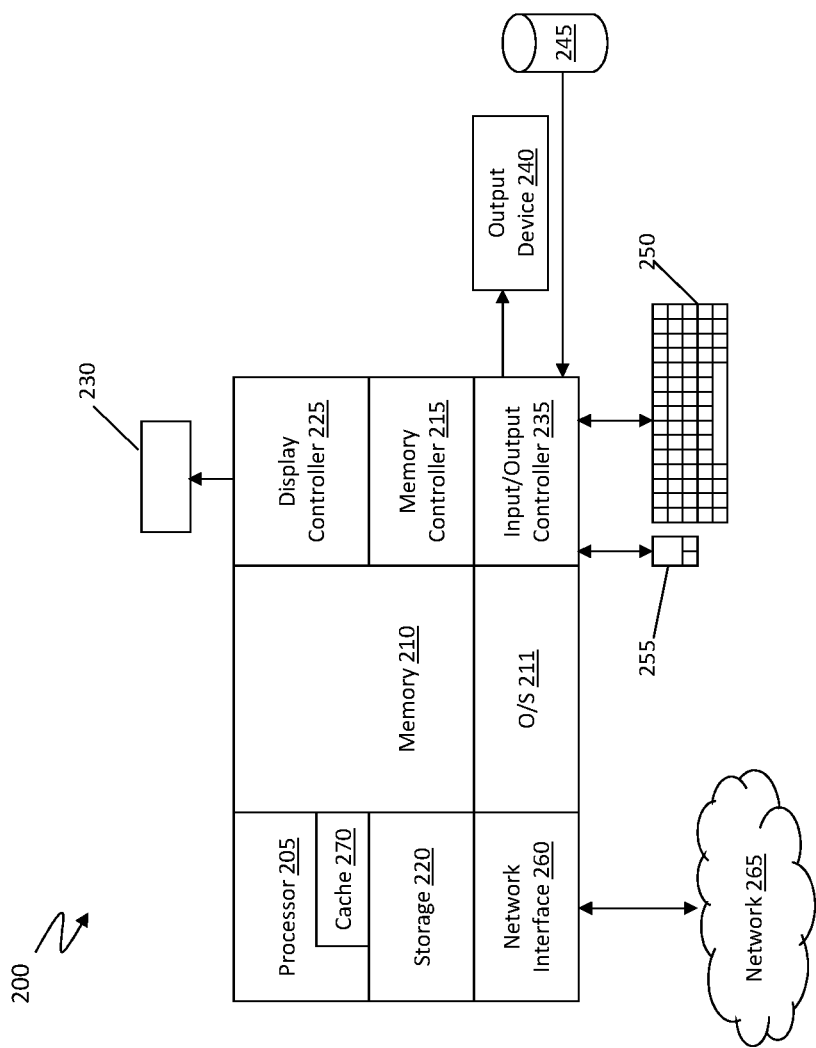
FIG. 2 illustrates an example existing system for generating bounding boxes in images.

FIG. 2 illustrates an example system 200. The system 200 represents a computing device that communicates via a network 265. The system 200 includes hardware, such as electronic circuitry and can be any of the computing device used by one or more embodiments of the present invention.

The system 200 includes, among other components, a processor 205, memory 210 coupled to a memory controller 215, and one or more input devices 245 and/or output devices 240, such as peripheral or control devices, that are communicatively coupled via a local I/O controller 235. These devices 240 and 245 may include, for example, battery sensors, position sensors, indicator/identification lights and the like. Input devices such as a conventional keyboard 250 and mouse 255 may be coupled to the I/O controller 235. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The I/O devices 240, 245 may further include devices that communicate both inputs and outputs, for instance disk and tape storage, a network interface card (MC) or modulator/demodulator (for accessing other files, devices, systems, or a network), a radio frequency (RF) or other transceiver, a telephonic interface, a bridge, a router, and the like.

The processor 205 is a hardware device for executing hardware instructions or software, particularly those stored in memory 210. The processor 205 may be a custom made or commercially available processor, a central processing unit (CPU), an auxiliary processor among several processors associated with the system 200, a semiconductor based microprocessor (in the form of a microchip or chip set), a macroprocessor, or other device for executing instructions. The processor 205 includes a cache 270, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 270 may be organized as a hierarchy of more cache levels (L1, L2, and so on.).

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS) 211. The operating system 211 essentially may control the execution of other computer programs and provides scheduling, input-output control, file and data management, memory management, and communication control and related services.

Additional data, including, for example, instructions for the processor 205 or other retrievable information, may be stored in storage 220, which may be a storage device such as a hard disk drive or solid state drive. The stored instructions in memory 210 or in storage 220 may include those enabling the processor to execute one or more aspects of the systems and methods described herein.

The system 200 may further include a display controller 225 coupled to a user interface or display 230. In some embodiments, the display 230 may be an LCD screen. In other embodiments, the display 230 may include a plurality of LED status lights. In some embodiments, the system 200 may further include a network interface 260 for coupling to a network 265. The network 265 may be an IP-based network for communication between the system 200 and an external server, client and the like via a broadband connection. In an embodiment, the network 265 may be a satellite network. The network 265 transmits and receives data between the system 200 and external systems. In some embodiments, the network 265 may be a managed IP network administered by a service provider. The network 265 may be implemented in a wireless fashion, for example, using wireless protocols and technologies, such as WiFi, WiMax, satellite, or any other. The network 265 may also be a packet-switched network such as a local area network, wide area network, metropolitan area network, the Internet, or other similar type of network environment. The network 265 may be a fixed wireless network, a wireless local area network (LAN), a wireless wide area network (WAN) a personal area network (PAN), a virtual private network (VPN), intranet or other suitable network system and may include equipment for receiving and transmitting signals.

As described earlier, the existing system that is used for marking training images with bounding boxes requires substantial manual input, which increases cost and time required for generating the training image set 130 that is used for training the ANN of the object detection system 140.

Accordingly, one or more embodiments of the present invention use a second ANN to automatically generate bounding boxes and generate the training image set 130. The ANN can generate the bounding boxes as an extremely parallel task, and hence, can be accelerated by using more machines to execute the ANN. Further, the one or more embodiments of the present invention facilitate using the ANN for base objects as well as custom objects.

Figure 3:
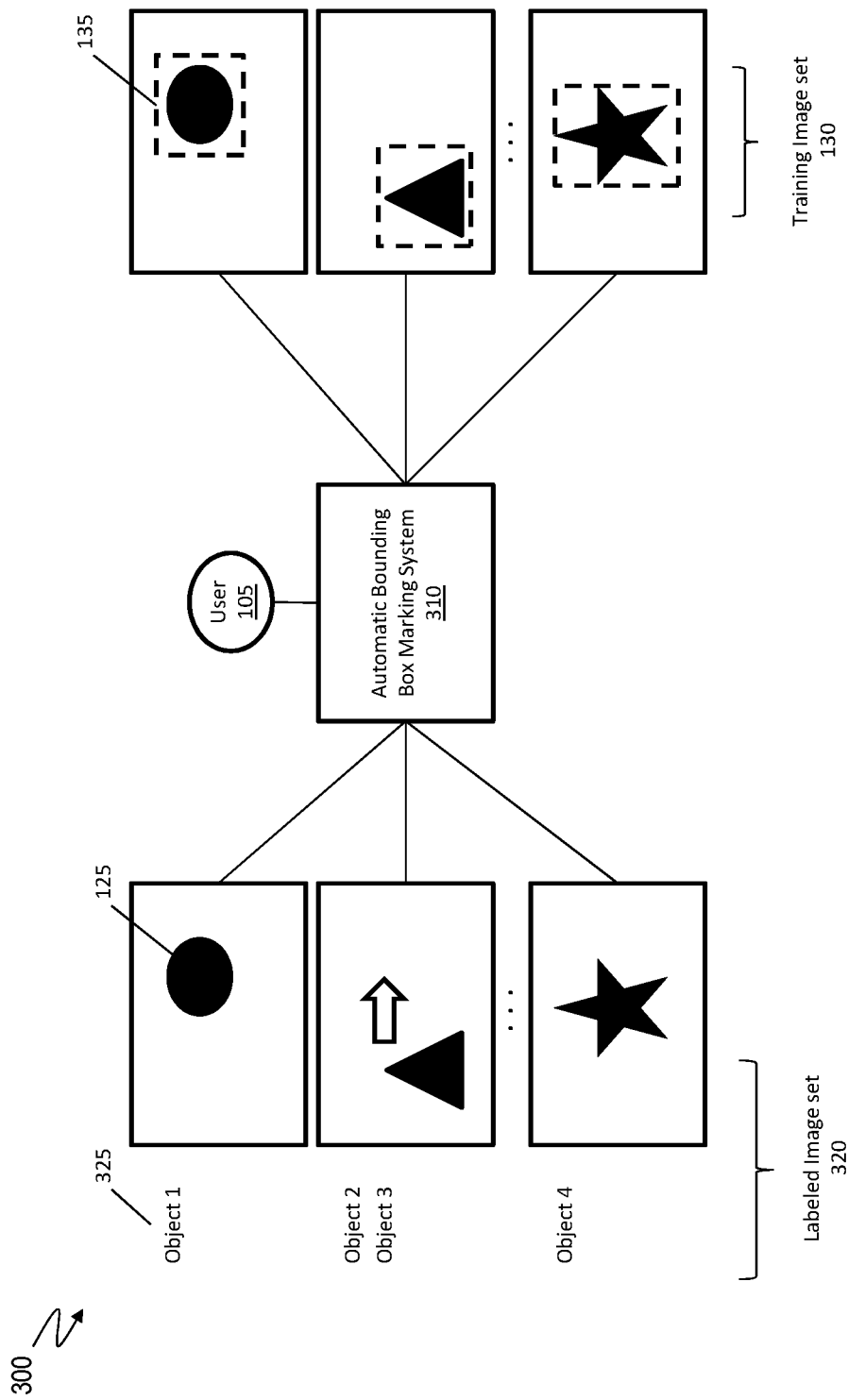
FIG. 3 depicts a block diagram of a system for automatically generating the training image set according to one or more embodiments of the present invention.

FIG. 3 depicts a block diagram of a system for automatically generating the training image set according to one or more embodiments of the present invention. The depicted system 300 includes an automatic bounding box marking system 310 that uses a labeled image set 310. The automatic bounding box marking system 310 can be a computing device. The labeled image set 310 includes multiple images and multiple labels 325 of the objects 125 included in the images. For example, as depicted, a first label 325 indicates that a first image includes object-1, a second label indicates that a second image includes object-2, a third label indicates that the second image also includes object-3, and so on.

The automatic bounding box marking system 310 generates the training image set 130 that includes the images from the labeled image set 120, with each image including one or more bounding boxes 135. A bounding box 135 marks the boundaries of a corresponding object 125 in the image. In a 2D image, the bounding box 125 includes four sides, each side marking a boundary of the object 125 in a particular orientation. For example, in case of the 2D image, the bounding box includes a top side, a left side, a right side, and a bottom side, each corresponding to the top, left, right, and bottom edges of the image, respectively. The bounding box 125 may be a rectangle, a square, or any other 2D enclosure. In one or more examples, the bounding box 135 can be stored as coordinates that indicate the four sides of the bounding box 135. Any other technique can be used to store the bounding box 135.

Figure 4:
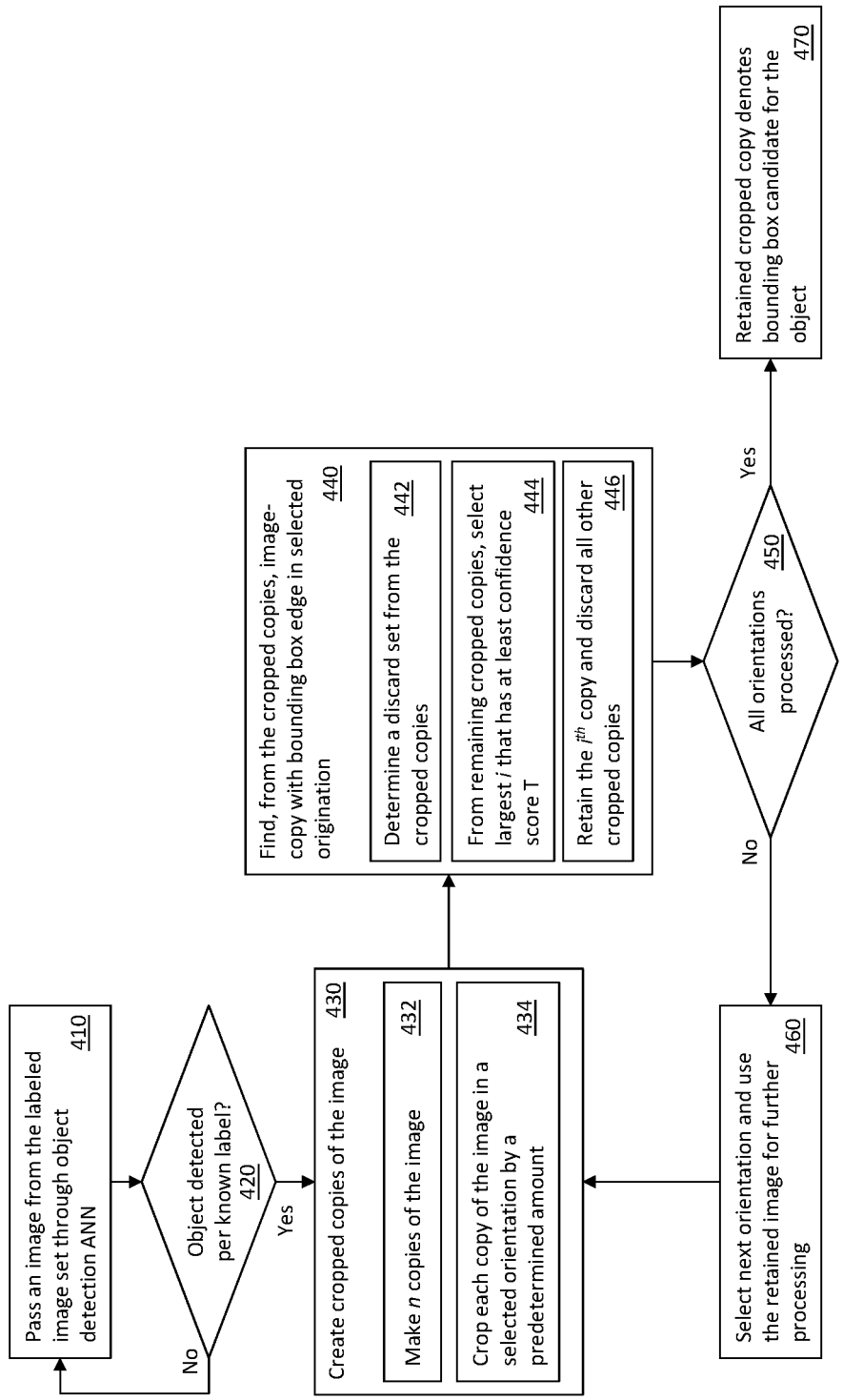
FIG. 4 depicts a flowchart for a method of automatically generating a training image set according to one or more embodiments of the present invention.

FIG. 4 depicts a flowchart for a method of automatically generating the training image set according to one or more embodiments of the present invention. Here, automatic generation is performed without the user 105 marking the bounding boxes on the images. As depicted, the method includes accessing the images from the labeled image set 320. The labeled image set 130 includes multiple images and labels 325 associated with the images to indicate the objects 125 in the images. For example, in the case of IMAGENET-22K, and PLACES-2 datasets the labeled image set 320 includes 14 million images and 8 million images, respectively.

Each image in the labeled image set 320 is passed through a first ANN to determine if the ANN can detect the object 125 corresponding to a label 325 that is associated with that image (410). If the object 125 can be detected by the first ANN (420), cropped copies of the image are created (430).

Creating the cropped copies includes making n copies of the image (432) and cropping each copy of the image from a selected orientation by a predetermined amount (434). For example, say the selected orientation is right and the predetermined amount is i*(1/n)* 100% of the image, where i indicates which copy is being cropped (434). Here, n is a predetermined number of copies, and can be configured. For example, if n is 50, the first copy of the image (i=1) will be cropped 2% from the right, the 2nd copy (i=2) is cropped 4% and so on. Here, 2% indicates that 2% of the length of the image is cropped from the selected orientation, which in this example is right.

Figure 5:
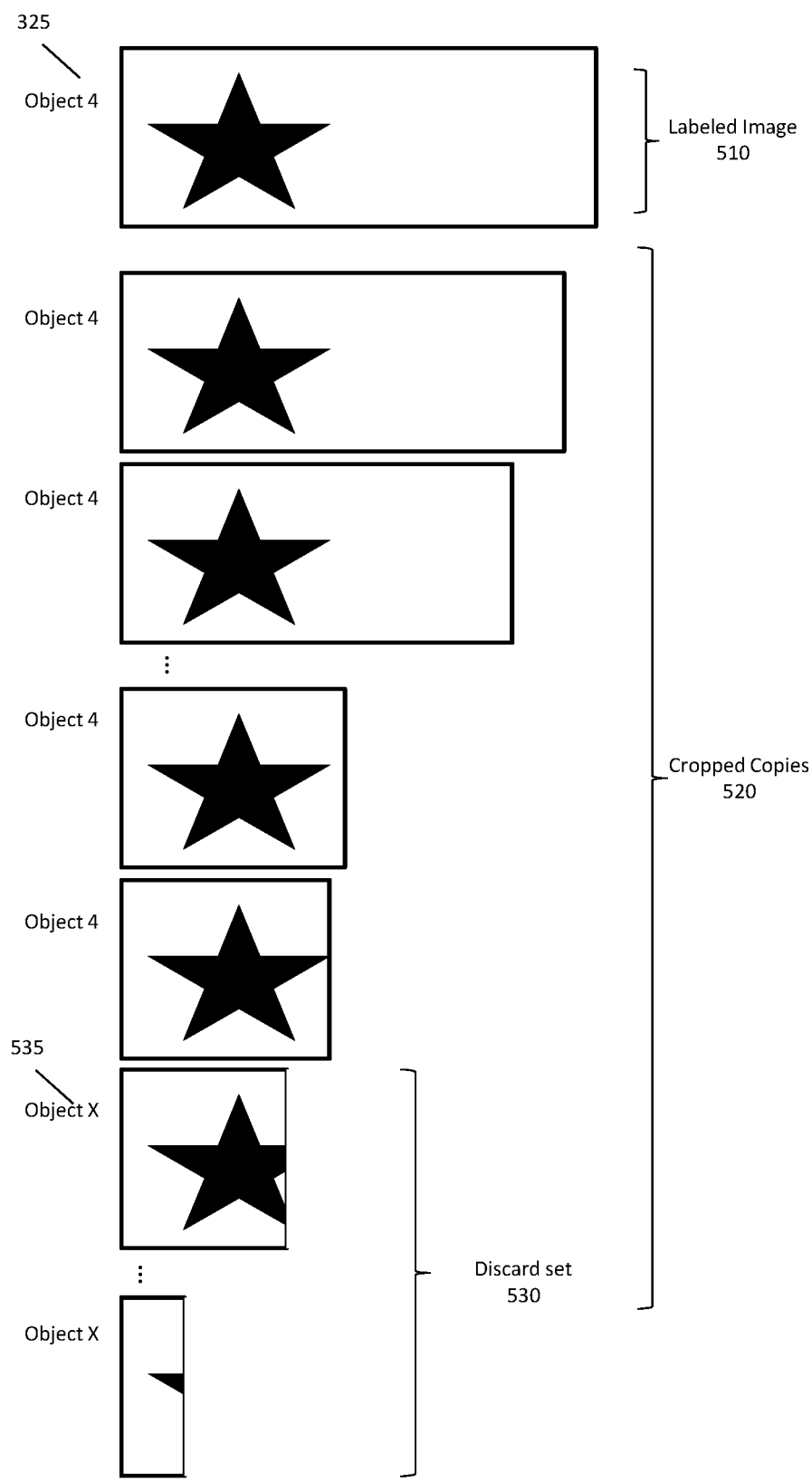
FIG. 5 depicts a visual representation of an example scenario of one or more embodiments of the present invention.

FIG. 5 depicts the above example scenario visually. A labeled image 510 from the labeled image set 320 is selected for generating the bounding box. Here, the selected orientation for the cropping is from the right. After making n copies of the image 510, each copy is cropped by a corresponding predetermined amount that depends on which copy is being cropped, each copy being cropped by a different amount. In a similar manner, the labeled image 510 can be cropped in other orientations, such as top, down, and left.

Referring to FIG. 4, each copy of the image, is passed through the object detection ANN to determine if the object 125 can be detected from the copy that matches with the label 325 that is associated with that image (440). In one or more examples, a confidence score is also generated by the object detection ANN, the confidence score indicating a level of confidence for the detected object. It is to be noted that the object detection ANN can be run on a graphics processing unit (GPU), central processing unit (CPU) or any other type of processing unit. On hardware (like GPUs), that facilitate parallel processing, the method can include passing multiple images in parallel for processing as described herein. Accordingly, the method described herein can be accelerated by processing multiple images concurrently in this manner.

Further, the method includes finding, from the cropped copies 520, an image-copy with bounding box edge in the selected orientation (440). Selecting the image-copy includes, determining, from the cropped copies 520, a discard set 530 of the cropped copies (442). The discard set 530 includes the cropped copies that result in a different label 535 than the label 325 that was associated with the image 510. For the remaining cropped copies, (non-discard) the image-copy 550 is selected that has the largest value of i and which resulted in at least a predetermined threshold of confidence score when detecting the object 125 per the label 325 (444). The predetermined threshold can be an absolute value (e.g. 80% confidence), or a proportional value (90% of highest confidence value of the cropped copies). The selected image-copy 550 is retained for further processing and all other copies are discarded (446).

The method further includes determining if the image 510 has been processed in all orientations (top, right, bottom, left) (450). If not, a next orientation is selected and the retained selected image-copy 550 is processed again as described herein (460). The order in which the orientations are processed van vary from one example to another. Once all orientations have been processed (460), the resultant selected image-copy 550 denotes a minimal image where the object 125 can be identified with at least the predetermined threshold confidence and the edges of the object are a candidate bounding box 135 (470).

In one or more examples, the method is repeated with a different order of the orientations being selected. For example, in a first iteration the orientations may be selected from left to right or top to bottom, while in a second iteration, the orientations are selected in any other order. Each iteration can result in a different candidate bounding box. In case multiple candidate bounding boxes are generated, any of those candidate bounding boxes or a combination of the candidate bounding boxes can be considered as the bounding box 135. For example, a combination of the candidate bounding boxes can be the maximal encompassing box from the candidate bounding boxes, which is used as the bounding box 135.

One or more embodiments of the present invention facilitate determining a bounding box for an object in an image. A method for determining the bounding box includes determining a label for an object in a first image using a first neural network. Further, the method includes, for each of a right direction, left direction, top direction, and bottom direction, generating a set of images based on the first image, wherein each image of the set of images is generated by cropping the first image from a given direction. The method further includes determining labels for each image in the set of images using the first neural network. The method further includes removing images from the set of images such that each image remaining in the set of images has a label matching the label for the object in the first image. Further, the method includes determining a key image for the set of images, wherein the key image is the smallest image of the set of images that has a confidence score exceeding a threshold, and determining a bounding box for the object in the first image based on the perimeter of the portion of the first image that overlaps each key image for each direction.

Instead of generating the bounding boxes by operating multiple slices of the images concurrently, one or more embodiments of the present invention facilitate automatically determining a bounding box for an object in an image by repetitively slicing the image by cropping the image and determining if the cropped portion contains the object. A method for determining the bounding box includes determining a label for an object in an image. The method further includes generating a first cropped image by cropping the image by a predetermined amount along a first orientation (or direction). The method further includes determining that the first cropped image includes the object, and in which case, replacing the image with the first cropped image. Based on determining that the first cropped image does not include the object, determining a bounding box for the object in the image by using dimensions of the first copped image.

The bounding box is a first bounding box along the first orientation, and further, the method includes determining a second bounding box along a second orientation by cropping the image along the second orientation. In one or more examples, the final image from the iteration for the first orientation is used as the starting image for the second orientation. The first bounding box and the second bounding box are for the same object. In one or more examples, the first bounding box and the second bounding box are for different objects. As described herein, the label for the object is determined by a neural network, separate from a neural network that uses the generated bounding boxes as training data.

Accordingly, one or more embodiments of the present invention facilitate autonomous generation of bounding boxes for one or more image sets. Each of the bounding boxes encompasses an object in an image from an image set. The bounding boxes are generated autonomously using machine learning, such as using neural networks. The bounding boxes thus generated are used for creating training data for other machine learning systems, such as neural network systems for object detection for images. For example, using IMAGENET-22K, one or more embodiments of the present invention can generate bounding boxes for 15000 to 21000 different objects and labels and is orders of magnitude faster compared to existing solutions for generating such bounding boxes.

The one or more embodiments of the present invention accordingly provide an improvement to computer technology, for example in the case of neural network training systems that require images that have bounding boxes for objects in the images for training one or more neural networks. The one or more embodiments of the present invention described herein use 2D images as examples, however, the one or more embodiments of the present invention can be used for generating bounding boxes for objects in 3D images, or other types of images. Further, one or more embodiments of the present invention, can be used to determine bounding boxes for n-dimensional objects.

The flowchart and block diagrams in the Figures illustrate the architecture, functionality, and operation of possible implementations of systems, methods and computer program products according to various embodiments of the present invention.

In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of determining a bounding box for an object in an image, the method comprising:
    determining a label for an object in a first image using a first algorithm;
    determining a selected direction:
        generating a set of images based on the first image, wherein each image of the set of images is generated by cropping the first image from the selected direction;
        determining labels for each image in the set of images using the first algorithm;
        removing images from the set of images such that each image remaining in the set of images has a label matching the label for the object in the first image; and
        determining a key image for the set of images, wherein the key image is the smallest image from the set of images that has a confidence score exceeding a threshold, the smallest image being an image with the smallest dimension in the selected direction; and
        determining a bounding box for the object in the first image based on a perimeter of a portion of the first image that overlaps the key image.

2. The computer-implemented method of claim 1, wherein the selected direction is one from a group of directions comprising right direction, left direction, top direction, and bottom direction.

3. The computer-implemented method of claim 2, wherein the bounding box for the object in the first image is determined based on the perimeter of the portion of the first image that overlaps each key image for each direction.

4. The computer-implemented method of claim 1, wherein the bounding box is a first bounding box along the selected direction, the method further comprising, determining a second bounding box along a second selected direction.

5. The computer-implemented method of claim 4, wherein the first bounding box is for the object and the second bounding box is for another object in the first image.

6. The computer-implemented method of claim 1, wherein the first image is a two-dimensional (2D) image.

7. The computer-implemented method of claim 1, wherein the first image is an n-dimensional image.

8. A system comprising:
    an image database comprising a plurality of images that contain one or more objects, and a plurality of labels identifying the one or more objects in the images;
    a plurality of processors configured to determine a bounding box for an object in a first image from the image database, wherein determining the bounding box comprises a method, which comprises:
    determining a label for the object in the first image using a first algorithm;
    for a selected direction:
        generating a set of images based on the first image, wherein each image of the set of images is generated by cropping the first image from a given direction;
        determining labels for each image in the set of images using the first algorithm;
        removing images from the set of images such that each image remaining in the set of images has a label matching the label for the object in the first image; and
        determining a key image for the set of images, wherein the key image is the smallest image of the set of images that has a confidence score exceeding a threshold; and
        determining a bounding box for the object in the first image based on a perimeter of a portion of the first image that overlaps the key image.

9. The system of claim 8, wherein the selected direction is one from a group of directions comprising right direction, left direction, top direction, and bottom direction.

10. The system of claim 9, wherein the bounding box for the object in the first image is determined based on the perimeter of the portion of the first image that overlaps each key image for each direction.

11. The system of claim 8, wherein the bounding box is a first bounding box along the selected direction, the method further comprising, determining a second bounding box along a second selected direction.

12. The system of claim 11, wherein the first bounding box is for the object and the second bounding box is for another object in the first image.

13. The system of claim 8, wherein the first image is a two-dimensional (2D) image.

14. The system of claim 8, wherein the first image is a three-dimensional (3D) image.

15. A computer program product comprising a computer readable storage medium having stored thereon program instructions executable by one or more processing devices to perform a method comprising:
   determining a label for an object in a first image using a first algorithm; for a selected direction:
      generating a set of images based on the first image, wherein each image of the set of images is generated by cropping the first image from a given direction;
      determining labels for each image in the set of images using the first algorithm;
      removing images from the set of images such that each image remaining in the set of images has a label matching the label for the object in the first image; and
      determining a key image for the set of images, wherein the key image is the smallest image of the set of images that has a confidence score exceeding a threshold; and
      determining a bounding box for the object in the first image based on a perimeter of a portion of the first image that overlaps the key image.

16. The computer program product of claim 15, wherein the selected direction is one from a group of directions comprising right direction, left direction, top direction, and bottom direction.

17. The computer program product of claim 16, wherein the bounding box for the object in the first image is determined based on the perimeter of the portion of the first image that overlaps each key image for each direction.

18. The computer program product of claim 15, wherein the bounding box is a first bounding box along the selected direction, the method further comprising, determining a second bounding box along a second selected direction.

19. The computer program product of claim 15, wherein the first image is a two-dimensional (2D) image.

20. The computer program product of claim 15, wherein the first image is a three-dimensional (3D) image.

\* \* \* \* \*